(No Model.)
D. HIGGINS.
SEWER TRAP.
No. 403,106. Patented May 14, 1889.
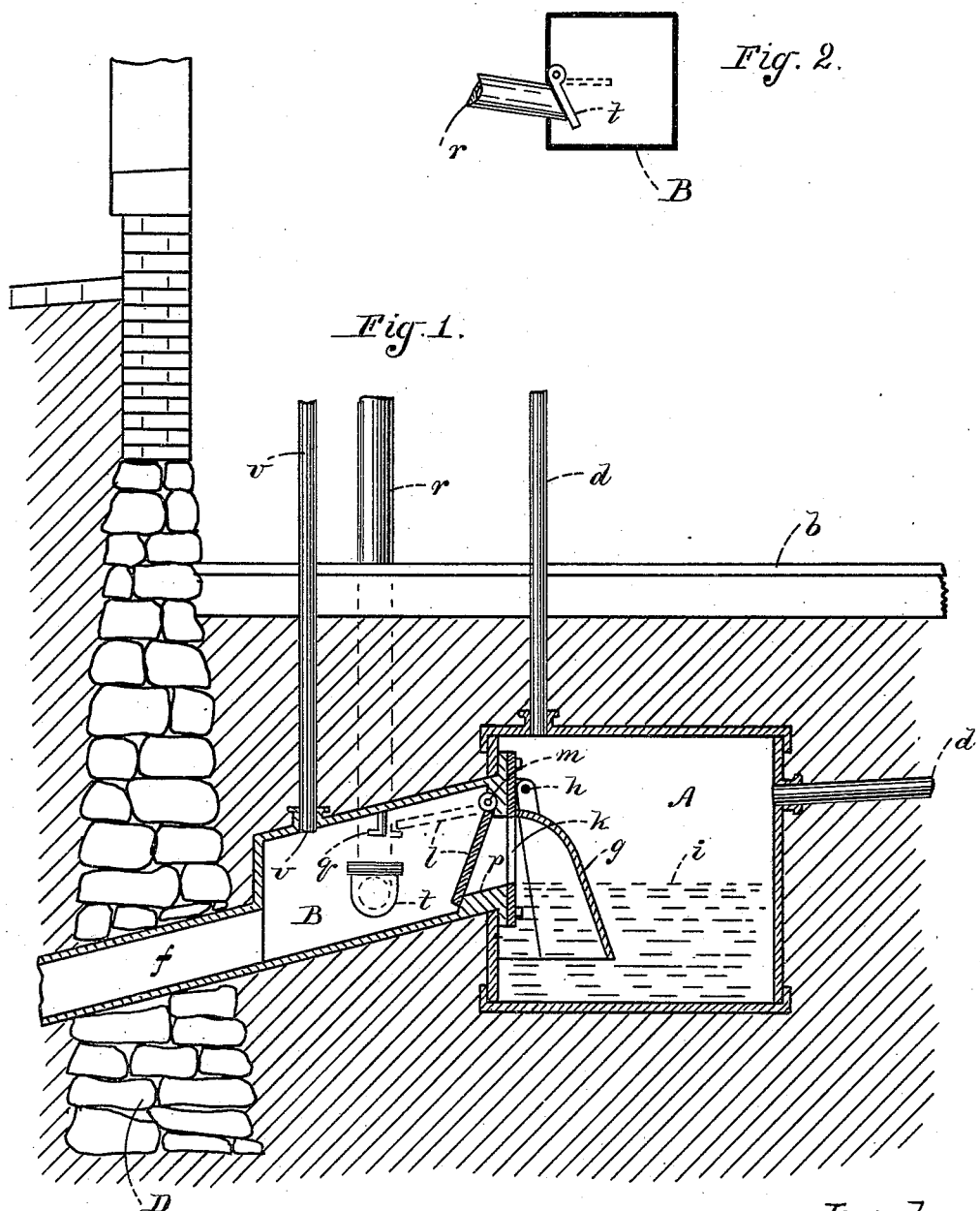
Witnesses:
K. Durfee,
H. McFeegan,
Inventor:
Daniel Higgins
per C. A. Shawles,
Atty's

UNITED STATES PATENT OFFICE.

DANIEL HIGGINS, OF BOSTON, MASSACHUSETTS, ASSIGNOR TO HIMSELF AND JAMES J. COSTELLO, OF SAME PLACE.

SEWER-TRAP.

SPECIFICATION forming part of Letters Patent No. 403,106, dated May 14, 1889.

Application filed January 25, 1889. Serial No. 297,555. (No model.)

*To all whom it may concern:*

Be it known that I, DANIEL HIGGINS, of Boston, in the county of Suffolk, State of Massachusetts, have invented a certain new and useful Improvement in Sewer-Traps, of which the following is a description sufficiently full, clear, and exact to enable any person skilled in the art or science to which said invention appertains to make and use the same, reference being had to the accompanying drawings, forming part of this specification, in which—

Figure 1 is a longitudinal section showing my improved sewer-trap in use, and Fig. 2 a sectional view illustrating certain details of construction.

Like letters and figures of reference indicate correspondiug parts in both figures of the drawings.

In the drawings, A represents the receiving-box, and B the body of the trap. The box A is composed of iron, and is disposed in the cellar of the building or below the floor $b$ thereof, as illustrated in the drawings. Waste-water pipes $d$, leading from the sinks and tubs of the building, discharge into the box A.

The body B of the trap opens into the box A near the top and inclines downward therefrom, a pipe, $f$, leading from its outer end through the foundation-wall D of the building to the sewer in the street. A semi-bell shaped hood, $g$, is hinged at $h$ to the upper part of the body B within the box A, and projects downward below the water-line $i$, said hood completely closing the mouth $k$ of said body above the water-line, at the same time permitting the water to pass upward under it and into the body.

A valve, $l$, consisting of a plate hinged at $m$ above the mouth $k$ and within the body B, has its lower or free end seated against a shoulder, $p$, in the bottom of said body, said plate thus completely closing the mouth thereof. A hook or catch, $q$, is pivoted in the top of the trap for sustaining the valve $l$ in the position shown by dotted lines in Fig. 1, and prevents it from closing the mouth $k$ of the trap, if desired. A waste-pipe, $r$, leading from the water-closets of the house, opens into the side of the trap B near the bottom, the mouth of said pipe being trapped within said body by a pivoted lid or plate, $t$, (see Fig. 2,) which is elevated by the flow of refuse from said pipe and falls, closing the mouth thereof when the flow has ceased.

A ventilating-pipe, $v$, extends from the top of the trap B, its opposite end opening outside the building, preferably through the roof thereof.

In the use of my improvement the water flows from the waste-pipes $d$ into the box A, and, rising under the hood $g$, it flows through the mouth $k$ of the trap against the valve $l$, which is thereby forced from its seat $p$, permitting the water to flow down the inclined bottom of the trap to the sewer. The water from the box A in passing through the trap B carries with it the refuse which may have collected therein from the waste-pipe $r$. It will be seen that as soon as the flow of water has ceased the weight of the valve $l$ will reseat it, closing the mouth $k$ and preventing gas or odors arising from the sewer from passing through the box A and pipes $d$ into the house. Moreover, the hood $g$ by closing the mouth $k$ above the water-line serves to direct any gas that may pass the valve $l$ into the water in the box A, rendering its escape into the building through the pipes $d$ practically impossible. The valve $t$, closing the mouth of the waste-pipe $r$ when the flow has ceased through it, traps said pipe from the sewer-gas. By inclining the bottom of the trap B and disposing the valve $l$ as described, the danger of water "backing" into the box A is overcome.

Having thus explained my invention, what I claim is—

1. In a sewer-trap, the combination of a receiving-box disposed within the building, an inclined trap connecting said box with the sewer, waste-pipes opening into said box, a waste-pipe opening into said trap and provided with a hinged valve, a ventilating-pipe for said trap, a hinged valve closing the mouth of the trap within its body and adapted to be opened by the water from said box, and a hinged hood closing the mouth of said trap within said body, all being arranged to operate substantially as described.

2. In a sewer-trap, the combination of the receiving-box A, the waste-pipes $d$, opening therein, the inclined trap B, connecting said box and the sewer, the waste-pipe $r$, opening into said trap and provided with the valve $t$, the hinged valve $l$, for automatically closing the mouth of said trap, and the hood $g$, hinged to said trap within said body, substantially as and for the purpose set forth.

3. In a sewer-trap, the receiving-box A and waste-pipes $d$, opening therein, in combination with the inclined trap B, opening into said box, the hinged valve $l$, for automatically closing the mouth of said trap, the hook $q$, for holding said valve open, the hood $g$, hinged to the trap within said box, the waste-pipe $r$, opening into said trap and provided with the valve $t$, and the ventilating-pipe $v$, all being arranged substantially as described.

4. In a sewer-trap, a receiving-box into which the waste-water pipes of the building empty, in combination with an inclined trap connecting said box with the sewer, a closet waste-pipe opening into said trap, and a hinged valve in said trap adapted to be opened by the water from said box, whereby the waste from said closet-pipe may be carried from the trap, substantially as described.

DANIEL HIGGINS.

Witnesses:
K. DURFEE,
O. M. SHAW.